(12) United States Patent
Murayama et al.

(10) Patent No.: US 8,996,599 B2
(45) Date of Patent: Mar. 31, 2015

(54) ARITHMETIC DEVICE FOR CALCULATING BETWEEN PHYSICAL QUANTITIES INCLUDING UNITS, AND DATABASE USED THEREBY

(75) Inventors: Hiroshi Murayama, Kanagawa-ken (JP); Akira Hosokawa, Kanagawa-ken (JP); Lan Wang, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 332 days.

(21) Appl. No.: 13/422,517

(22) Filed: Mar. 16, 2012

(65) Prior Publication Data
US 2013/0080494 A1    Mar. 28, 2013

(30) Foreign Application Priority Data
Sep. 26, 2011 (JP) ................. 2011-209988

(51) Int. Cl.
 G06F 7/38   (2006.01)
 G06F 15/00  (2006.01)
(52) U.S. Cl.
 CPC ..................................... G06F 15/00 (2013.01)
 USPC .......................................... 708/490; 708/517

(58) Field of Classification Search
None
See application file for complete search history.

(56) References Cited

U.S. PATENT DOCUMENTS 7,500,111 B2 * 3/2009 Hacigumus et al. .......... 713/193

* cited by examiner

*Primary Examiner* — Michael D Yaary
(74) *Attorney, Agent, or Firm* — Oblon, McClelland, Maier & Neustadt, L.L.P.

(57) ABSTRACT

An arithmetic device includes a database that stores a first indicator representing a base unit included in a unit system being assigned with a prime number other than a prime factor of a prefix, and a second indicator derived by combining the base units, in a form of a simple fraction; a conversion section that obtains a plurality of physical quantities each including a quantity, a prefix, and possibly a unit, to derive a third indicator by converting the unit into the first indicator and multiplying the converted first indicator by the prefix, or when the unit belongs to the derived unit, by converting the unit into the second indicator and multiplying the converted second indicator by the prefix; and an arithmetic section that performs calculation between the quantities of the plurality of physical quantities and between the third indicators.

4 Claims, 5 Drawing Sheets

ARITHMETIC DEVICE FOR CALCULATING BETWEEN PHYSICAL QUANTITIES INCLUDING UNITS, AND DATABASE USED THEREBY

CROSS-REFERENCE TO RELATED APPLICATIONS

This application is based upon and claims the benefit of priority from the prior Japanese Patent Application No. 2011-209988, filed on Sep. 26, 2011, the entire contents of which are incorporated herein by reference.

FIELD

Embodiments described herein generally relate to an arithmetic device and a database.

BACKGROUND

Generally, for a calculation between different physical quantities including units, the calculation is performed based on string processing.

However, for a calculation between different physical quantities including units and prefixes, if the calculation is performed based on the string processing, the handling may be very complicated because the differences in order of arithmetic expressions and in notation (font and the like) of units and prefixes should be taken into consideration for the string processing.

Moreover, it is difficult to accurately collate the units resulting from the calculation and thus it is difficult to obtain the calculation result without an error.

DETAILED DESCRIPTION

In view of the above circumstances, an aspect of embodiments provides an arithmetic device including: a database that stores a first indicator representing a base unit included in a unit system being assigned with a prime number other than a prime factor of a prefix which is expressed with a base, including the prime factor, and an exponential part, and a second indicator representing a derived unit expressed by combining the base units in a form of a simple fraction including a numerator and a denominator each of which is assigned with an integer which is the product of the first indicators; a conversion section that obtains a plurality of physical quantities each including a quantity, a prefix, and a unit, when the unit belongs to the base unit, the conversion section obtaining a third indicator by converting the unit into the first indicator and multiplying the converted first indicator by the prefix, or when the unit belongs to the derived unit, the conversion section obtaining the third indicator by converting the unit into the second indicator and multiplying the converted second indicator by the prefix; and an arithmetic section that performs a calculation between the quantities of the plurality of physical quantities and between the third indicators.

In view of the above circumstances, another aspect of the embodiments provides a database that stores a first indicator representing a base unit included in a unit system being assigned with a prime number other than a prime factor of a prefix which is expressed with a base, including the prime factor, and an exponential part, and a second indicator representing a derived unit expressed by combining the base units in a form of a simple fraction including a numerator and a denominator each of which is assigned with an integer which is the product of the first indicators.

According to the aspects of embodiments, a calculation can be performed between different physical quantities including a unit and a prefix without an error.

Herein below, embodiments for carrying out the invention will be described.

First Embodiment

Figure 1:
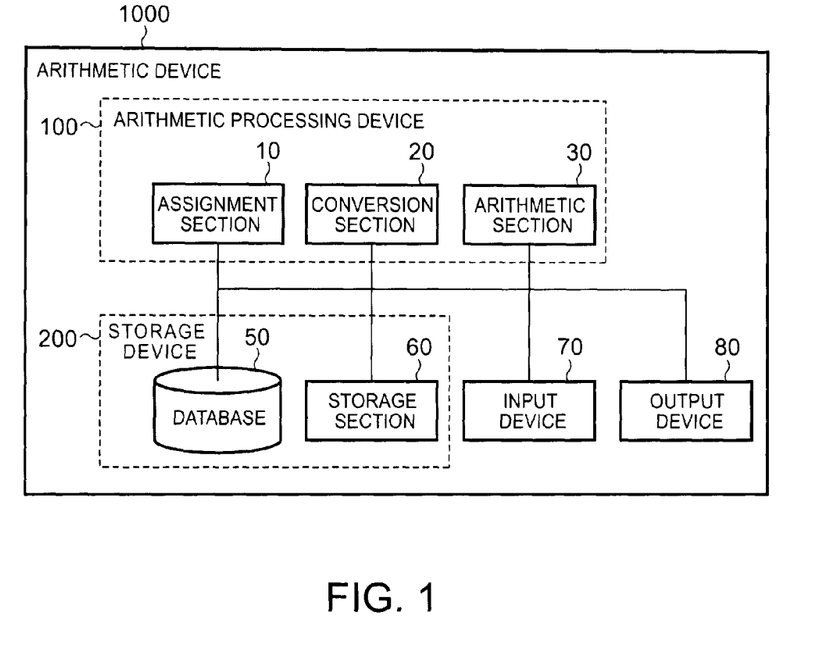
FIG. 1 is a diagram illustrating a configuration of an arithmetic device according to a first embodiment.

FIG. 1 is a diagram illustrating a configuration of an arithmetic device 1000 according to a first embodiment.

The arithmetic device 1000 according to this embodiment performs a calculation between different physical quantities each including a prefix and a unit.

The arithmetic device 1000 illustrated in FIG. 1 includes an assignment section 10, a conversion section 20, an arithmetic section 30, a database 50, a storage section 60, an input device 70 such as a keyboard, and an output device 80 such as a display. Further, the assignment section 10, the conversion section 20, and the arithmetic section 30 are implemented by an arithmetic processing device 100 such as a CPU or the like. In addition, the database 50 and the storage section 60 are implemented by a storage device 200 such as a memory.

Herein below, the functions of the assignment section 10 will be described in detail.

The assignment section 10 assigns a unique prime number (hereinafter, referred to as a first indicator), as an identifier (ID) to be uniquely determined, to each of the SI base units for physical quantities, and stores the identifiers into the database 50.

In addition, the assignment section 10 assigns a set of unique integers (hereinafter, referred to as a second indicator) to a derived unit which is obtained by combining the SI base units and can be expressed in the form of a simple fraction when combined, and stores the set as an integer value into the database 50.

(Base Unit)

Figure 2:
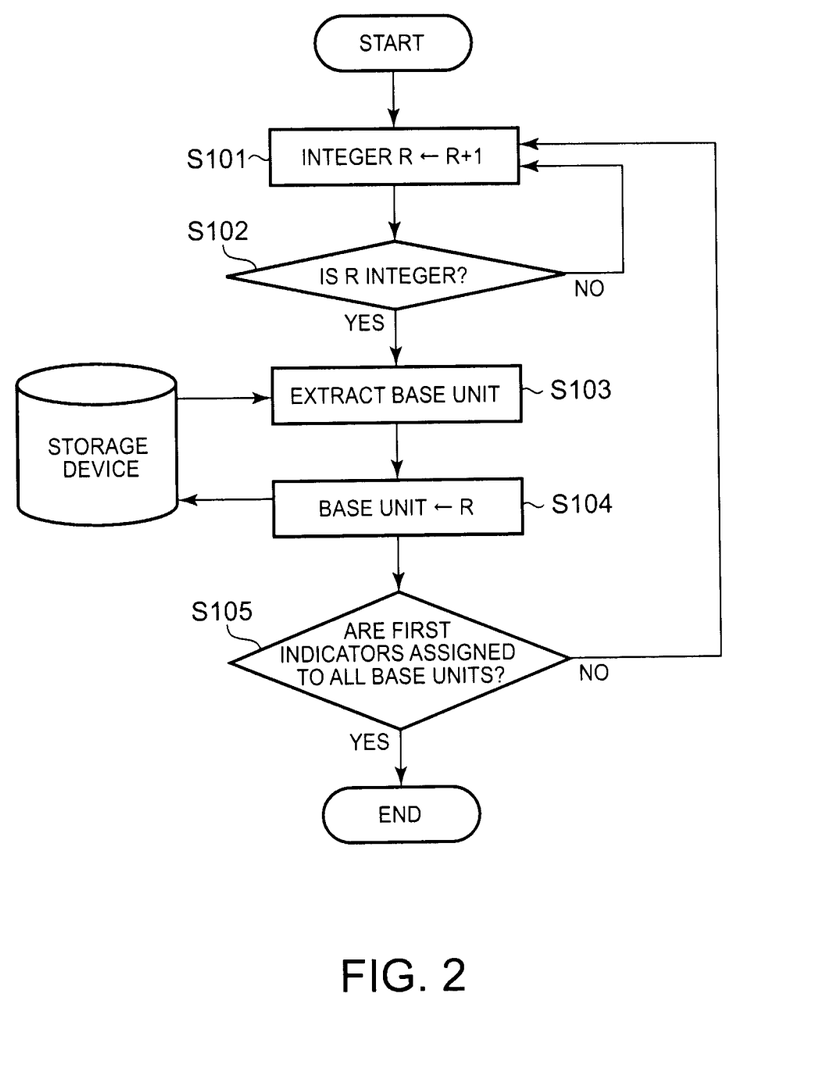
FIG. 2 is a flowchart illustrating a process by an assignment section of the arithmetic device according to the first embodiment (assignment to a base unit).

FIG. 2 is a flowchart illustrating a process of assigning the first indicator to a base unit.

The assignment section 10 counts up integers in ascending order (S101), and determines whether or not the counted integer is a prime number based on a known method, for example, the Erastothenes' sieve, the Adleman-Pomerance-Rumely (APR) primality test, or the like (S102).

Here, the prime numbers under 100 include 2, 3, 5, 7, 11, 13, 17, 19, 23, 29, 31, 37, 41, 43, 47, 53, 59, 61, 67, 71, 73, 79, 83, 89, and 97.

In a case where the counted integer is a prime number, the assignment section 10 refers to a first list which includes base units to be assigned with first indicators stored in the storage section 60. Then, the assignment section 10 extracts base units one by one in order of the first list (S103). The assignment section 10 assigns one of the first indicators to the extracted base unit (S104). In a case where the counted integer is not a prime number, the assignment section 10 resumes counting up integers until a prime number appears.

The assignment section 10 assigns a unique first indicator to each of the base units (including dimensionless quantities) which have been listed in the first list stored in the storage section 60 (S105).

Table 1 is a table illustrating an example of the first indicator assigned to the SI base units (m, Kg, s, A, K, Cd, and mol).

TABLE 1

| Base unit | SI unit | First indicator |
|---|---|---|
| Length | m | 3 |
| Mass | Kg | 7 |
| Time | s | 11 |
| Electric current | A | 13 |
| Temperature | K | 17 |
| Luminous intensity | Cd | 19 |
| Amount of substance | mol | 23 |

Further, the dimensionless quantities such as radian, steradian, and the like are set to 1 (dimension=1) in the SI units, which is different from integers corresponding to the physical quantities. Therefore, each dimensionless quantity can be assigned with a unique first indicator so as to be treated as a base unit.

As listed in Table 2, regarding the dimensionless quantities (rad, sr, etc.) as the base units, the assignment section 10 can assign the unique first indicators to the dimensionless quantities.

TABLE 2

| Dimensionless quantity | SI unit | First indicator |
|---|---|---|
| Radian | rad | 29 |
| Steradian | sr | 31 |

(Derived Unit)

A derived unit in the SI units can be expressed by combining the base units, that is, by performing multiplication or division between the base units (for example, Newton N=kg·m/s$^2$). As listed in Table 3, the relation between the derived units and the base units can be stored in advance in the storage section 60 as a second list.

TABLE 3

| Derived unit | Name of unit | SI unit | Expression in terms of SI base unit |
|---|---|---|---|
| Frequency | Hertz | Hz | $s^{-1}$ |
| Force | Newton | N | $m \cdot kg \cdot s^{-2}$ |
| Pressure/Stress | Pascal | Pa | $m^{-1} \cdot kg \cdot s^{-2}$ |
| Energy/Work | Joule | J | $m^2 \cdot kg \cdot s^{-2}$ |
| Power | Watt | W | $m^2 \cdot kg \cdot s^{-3}$ |
| Electric charge/Quantity of electricity | Coulomb | C | $s \cdot A$ |
| Voltage/Electrical potential difference | Volt | V | $m^2 \cdot kg \cdot s^{-3} \cdot A^{-1}$ |
| Electric capacitance | Farad | F | $m^{-2} \cdot kg^{-1} \cdot s^4 \cdot A^2$ |

TABLE 3-continued

| Derived unit | Name of unit | SI unit | Expression in terms of SI base unit |
|---|---|---|---|
| Electric resistance | Ohm | Ω | $m^2 \cdot kg \cdot s^{-3} \cdot A^{-2}$ |
| Conductance | Siemens | S | $m^{-2} \cdot kg^{-1} \cdot s^3 \cdot A^2$ |
| Magnetic flux | Weber | Wb | $m^2 \cdot kg \cdot s^{-2} \cdot A^{-1}$ |
| Magnetic flux density | Tesla | T | $kg \cdot s^{-2} \cdot A^{-1}$ |
| Inductance | Henry | H | $m^2 \cdot kg \cdot s^{-2} \cdot A^{-2}$ |
| Luminance | Lux | lx | $m^{-2} \cdot cd$ |
| Radioactivity | Becquerel | Bq | $s^{-1}$ |
| Absorbed dose | Gray | Gy | $m^2 \cdot s^{-2}$ |
| Equivalent dose | Sievert | Sv | $m^2 \cdot s^{-2}$ |
| Catalytic activity | Katal | kat | $s^{-1} \cdot mol$ |

Figure 3:
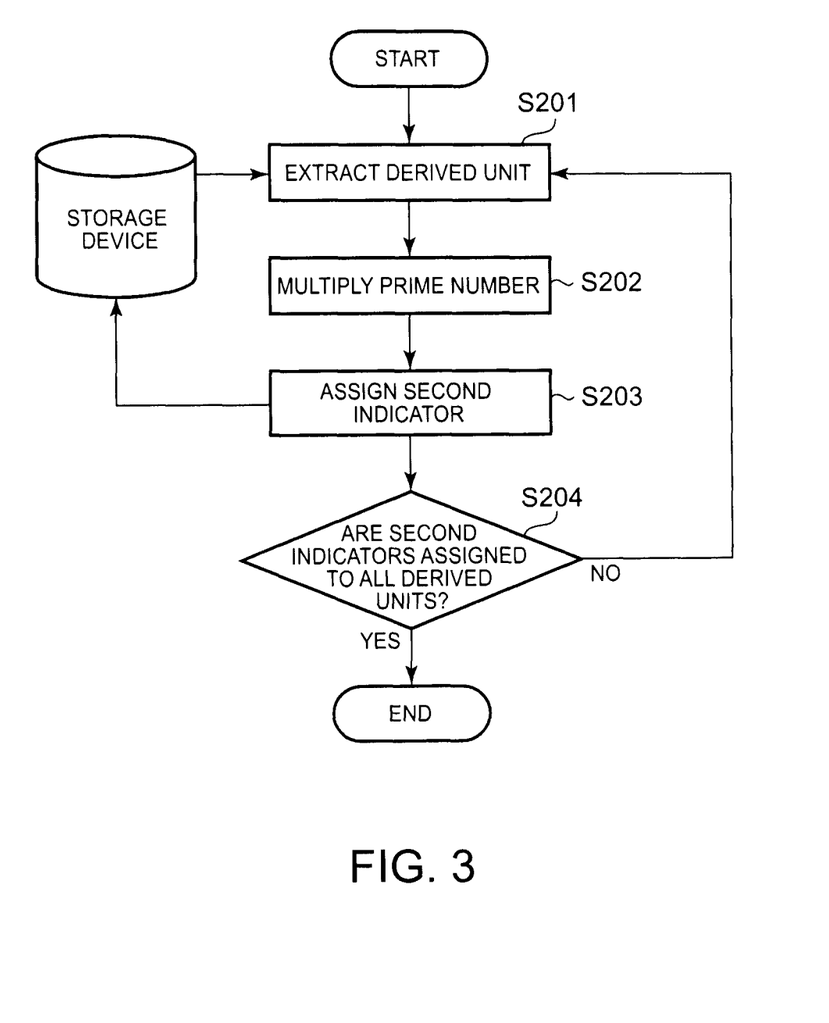
FIG. 3 is a flowchart illustrating another process by the assignment section of the arithmetic device according to the first embodiment (assignment to a derived unit).

FIG. 3 is a flowchart illustrating a process of assigning the second indicator to the derived unit.

The assignment section 10 reads out the prime numbers assigned to the base units as the first indicators from the database 50. The assignment section 10 extracts a derived unit in order of the second list with reference to the second list stored in the storage section 60 (S201). Then, for each of the numerator and the denominator, the assignment section 10 multiplies the prime numbers, which are the first indicators representing the base units that constitute the numerator or the denominator, in accordance with the expression in which the base units of the derived unit are used (S202). For example, in regard to the expression of Newton (N) in which base units are used, the numerator is expressed as Kg·m. Therefore, based on the first indicators of the base units listed in Table 1, '7×3=21' is obtained. Similarly, since the denominator is s$^2$, '11×11=121' is similarly obtained based on Table 1.

The assignment section 10 assigns a sequence, which is an integer set of the numerator and the denominator, to the derived unit as the second indicator (S203), and stores the sequence in the database 50. According to the example of Newton (N) described above, the second indicator for Newton (N) is given (21, 121).

The assignment section 10 assigns a unique second indicator to each of the derived units listed in the second list which is stored in the storage section 60 (S204).

Table 4 is a table showing an example in which the second indicators are assigned to the derived units in the SI units. Further, in a case where any one of the numerator and the denominator is dimensionless like the derived units such as Frequency (Hz) and Coulomb (C) listed in Table 4, the dimensionless unit is set to 1, and then a set of "1" and an integer is assigned as the second indicator. In other words, in the example of Table 4, (1, 11) is assigned for Frequency (Hz) and (143, 1) is assigned for Coulomb (C).

In addition, for example, in a case where a plurality of the derived units are in the same dimension like the derived units such as Frequency (Hz), Radioactivity (Bq), and the like, the numerator or the denominator is multiplied by a unique prime number for identifying the unit so that different second indicators are assigned to respective derived units. In the example of Frequency (Hz) and Radioactivity (Bq) listed in Table 4, since both derived units are expressed with s$^{-1}$, (1, 11) is assigned to Frequency (Hz) as the second indicator. For distinguishing Radioactivity (Bq) from Frequency (Hz), the prime number 37 is multiplied by the numerator, thereby assigning (37, 11) as the second indicator.

Similarly, for example, the absorbed dose shown with Gray (Gr) and the equivalent dose shown with Sievert (Sv) are in the same dimension of $[m^2 \cdot s^{-2}]$. Further, the equivalent dose is a value calculated by multiplying the absorbed dose by an effective count ($W_R$) regarding a human body which is different depending on the type of radiation. Therefore, by assigning one prime number of 41 to the effective count ($W_R$), in a case where the absorbed dose is expressed as (9, 121), the equivalent dose can be expressed as (9×41, 121)=(369, 121). With the second indicator determined as above, the absorbed dose and the equivalent dose can be distinguished from each other.

TABLE 4

| Derived unit | Named unit | SI unit | Expression in terms of SI base unit | Second indicator |
|---|---|---|---|---|
| Frequency | Hertz | Hz | $s^{-1}$ | (1, 11) |
| Force | Newton | N | $m \cdot kg \cdot s^{-2}$ | (21, 121) |
| Pressure/Stress | Pascal | Pa | $m^{-1} \cdot kg \cdot s^{-2}$ | (7, 363) |
| Energy/Work | Joule | J | $m^2 \cdot kg \cdot s^{-2}$ | (63, 121) |
| Power | Watt | W | $m^2 \cdot kg \cdot s^{-3}$ | (63, 1331) |
| Electric charge/Quantity of electricity | Coulomb | C | $s \cdot A$ | (143, 1) |
| Voltage/Electrical potential difference | Volt | V | $m^2 \cdot kg \cdot s^{-3} \cdot A^{-1}$ | (63, 17303) |
| Electric capacitance | Farad | F | $m^{-2} \cdot kg^{-1} \cdot s^4 \cdot A^2$ | (2474329, 63) |
| Electric resistance | Ohm | Ω | $m^2 \cdot kg \cdot s^{-3} \cdot A^{-2}$ | (63, 224939) |
| Conductance | Siemens | S | $m^{-2} \cdot kg^{-1} \cdot s^3 \cdot A^2$ | (224939, 63) |
| Magnetic flux | Weber | Wb | $m^2 \cdot kg \cdot s^{-2} \cdot A^{-1}$ | (63, 1573) |
| Magnetic flux density | Tesla | T | $kg \cdot s^{-2} \cdot A^{-1}$ | (7, 1573) |
| Inductance | Henry | H | $m^2 \cdot kg \cdot s^{-2} \cdot A^{-2}$ | (63, 20449) |
| Luminance | Lux | lx | $m^{-2} \cdot cd$ | (19, 121) |
| Radioactivity | Becquerel | Bq | $s^{-1}$ | (37, 11) |
| Absorbed dose | Gray | Gy | $m^2 \cdot s^{-2}$ | (9, 121) |
| Equivalent dose | Sievert | Sv | $m^2 \cdot s^{-2}$ | (369, 121) |
| Catalytic activity | Katal | kat | $s^{-1} \cdot mol$ | (23, 11) |

Herein below, the functions of the conversion section 20 and the arithmetic section 30 will be described in detail.

After the assignment section 10 stores the first and second indicators in the database 50 for all of the base units listed in the first list and the derived units listed in the second list, the arithmetic device 1000 performs a calculation between the different physical quantities using the first and second indicators stored in the database 50.

For example, when a user has inputted a physical quantity in the form of a string of a quantity and a string of a unit using the input device 70 at the time of designing, the conversion section 20 converts the string of a unit, input by the user, into a corresponding second indicator with reference to the database 50. Then, a set of the quantity and the second indicator is stored as a sequence in the storage section 60.

For example, when a user inputs a string of "50 N" using the input device 70, the conversion section 20 converts the string of Newton (N) into (21, 121) that is the second indicator with reference to the database 50.

Then, as a sequence which is a combination of the quantity "50" and the second indicator "(21, 121)", the sequence "(50, 21, 121)" is stored in the storage section 60. Further, in a case of the base unit, the denominator of the second indicator is set to an integer of 1.

Further, the user can input a prefix (k, M, G, etc.) in addition to the unit using the input device 70. In general, the prefix can be expressed in the form of $Z^n$, where Z represents a base and n represents an exponential part. Further, as the base Z, "10" is used for typical physical quantities, or 1024 (=$2^{10}$) is used for volume of information such as a bit or a byte. The relation between the prefix and $Z^n$ can be stored in the database 50 in advance as a third list.

When the user inputs a prefix in the form of a string using the input device 70, the conversion section 20 converts the string into the exponential part of $Z^n$, that is, into n that represents the prefix, by referring to the third list. Then, the conversion section 20 stores a set of the quantity, the second indicator, and the exponential part in the storage section 60 as a sequence.

For example, when the user inputs "50 kN" (50, N, and k represent a quantity, a unit, and a prefix, respectively) using the input device 70, the conversion section 20 converts Newton (N) into (21, 121) that is a second indicator with reference to the database 50. In addition, the conversion section 20 converts k into 3 which is the exponential part of $10^3$. Then, the conversion section 20 stores the sequence (50, 21, 121, 3) which is a set of the quantity of 50, the second indicator, and the exponential part, in the storage section 60.

In addition, the user may input an arithmetic expression including different physical quantities using the input device 70. In this case, the conversion section 20 converts each of the physical quantities into a sequence. However, for convenience of calculation to be described later, the conversion section 20 converts the physical quantity right after the division symbol "÷" or "/" into a sequence including a reciprocal number of the quantity, a second indicator in which the denominator and the numerator are exchanged in their positions, and a negative value of the exponential part.

When the user inputs an arithmetic expression of a plurality of different physical quantities in the form of a string, the arithmetic section 30 performs a calculation between the different physical quantities using the sequence (hereinafter, referred to as the sequence (a, b, c, d)) of the quantity, the second indicator, and the exponential part, which are converted by the conversion section 20 and stored in the storage section 60.

In the calculation performed between the plurality of different physical quantities, there is a feature as below depending on whether or not the units are equal to each other (a case of the arithmetic expression represented in the form of multiplication). Further, in this case, a suffix (1, 2, ..., n) is added in correspondence with the different physical quantity.

(i) In the case of different unit $$(\alpha_1 \times \alpha_2 \times \ldots \times \alpha_n) \times \left( \frac{b_1 \times b_2 \times \ldots \times b_n}{c_1 \times c_2 \times \ldots \times c_n} \right) \times B^{d_1 + d_2 + \ldots + d_n} \quad \text{(Equation 1)}$$

(ii) In the case of the same unit ($b = b_1 = b_2 = \ldots = b_n$, $c = c_1 = c_2 = \ldots = c_n$, $d = d_1 = d_2 = \ldots d_n$)

$$(\alpha'_1 + \alpha'_2 + \ldots + \alpha'_n) \times \frac{b}{c} \times B^d \quad \text{(Equation 2)}$$

Figure 4:
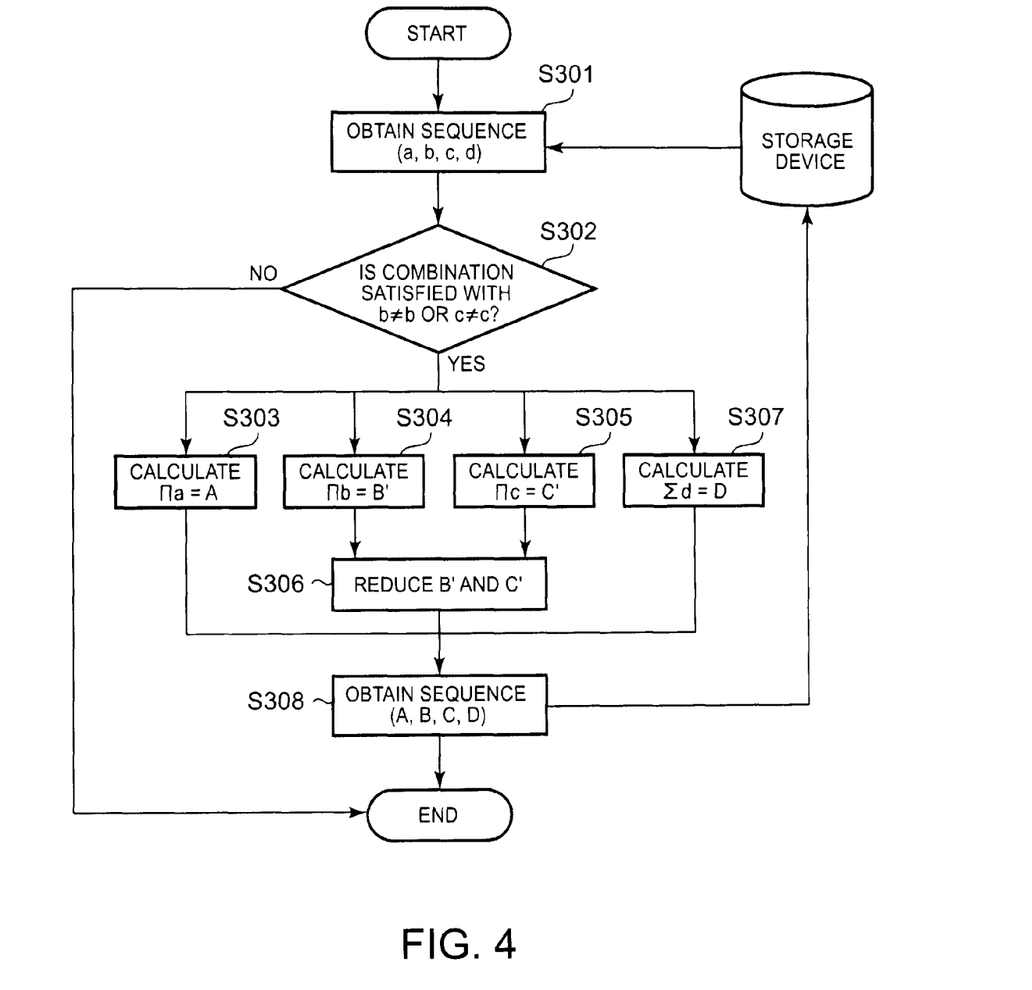
FIG. 4 is a flowchart illustrating a process by an arithmetic section of the arithmetic device according to the first embodiment.

FIG. 4 is a flowchart illustrating a process of calculation performed by the arithmetic section 30.

Specifically, the arithmetic section 30 obtains the sequence (a, b, c, d) for a plurality of physical quantities which have been converted by the conversion section 20 and stored in the storage section 60 (S301). At this time, the arithmetic section 30 sets d to 0 for the physical quantity to which the prefix has not been input so as to obtain a sequence (a, b, c, 0).

The arithmetic section 30 refers to all of the sequences obtained from the storage section 60 (S302). In a case where any one of b and c in the second indicator in each of the sequences is different from each other (that is, the case where the units are different from each other), the arithmetic section 30 performs a multiplication ($\pi a$=A) with the quantities based on Equation 1 (S303). In addition, the arithmetic section 30 performs a multiplication ($\pi b$=B') with the numerators in the second indicators, a multiplication ($\pi c$=C') with the denominators in the second indicators (S304 and S305). Then, the arithmetic section 30 performs a division (reduction) with B' and C' and a common factor, thereby calculating B and C (S306). In addition, the arithmetic section 30 performs an addition ($\Sigma d$=D) with the exponential parts (S307).

The arithmetic section 30 obtains a sequence (A, B, C, D) representing the physical quantity resulting from the calculations described above (S308), and stores the sequence in the storage section 60.

(Specific Example of Calculation)

Herein below, a specific calculation will be described based on an example of calculating Pressure (Pa).

A unit of Pressure (Pa) can be obtained by dividing Newton (N) by Area ($m^2$). For example, when a person weighing 50 kg gets on a stage of 50 $cm^2$ under the acceleration of gravity of 1 G (9.8 $m/s^2$), pressure applying on the stage can be calculated by 50 kg×9.8 $m/s^2$÷50 $cm^2$.

Herein, when the user inputs a string of "50 kg×9.8 $m/s^2$÷50 $cm^2$" using the input device 70 to calculate pressure, the conversion section 20 converts "50 kg" into a sequence of (50, 7, 1, 0), "9.8 $cm^2$" into a sequence of (9.8, 3, $11^2$, 0), and "50 $cm^2$" into a sequence of ($50^{-1}$, 1, $3^2$, $-(-2)\times 2$), and stores the sequences in the storage section 60.

The arithmetic section 30 performs a multiplication "50× 9.8×($50^{-1}$)" of the quantities, multiplications "7×3×1" and "1×$11^2$×$3^2$" of the second indicators, and an addition "0+0+(2×2)" of the exponential parts with reference to each of the sequences from the storage section 60 according to the flowchart illustrated in FIG. 4. Further, the arithmetic section 30 performs a reduction on the units, thereby obtaining the sequence (9.8, 7, 363, 4) representing the calculated physical quantities. Then, the arithmetic section 30 stores the obtained sequence in the storage section 60.

Further, in a case where the arithmetic expression includes the addition and subtraction operations, the arithmetic section 30 can perform calculations according to Equation 2. In this case, for example, it is determined that the units are equal to each other, so that the arithmetic section 30 performs a calculation when the units are the same. In a case where it is determined that the units are not the same, an error message is displayed by the output device 80 which will be described later, through which the user can visually recognize the result.

In addition, in a case where the arithmetic expression includes a combination of four arithmetic operations, the arithmetic section 30 may perform calculations according to Equations 1 and 2.

The conversion section 20 converts the unit into a string of the derived unit or the base unit where the second indicator is matched with the portion (B, C) representing the unit of the sequence (A, B, C, D) which is stored in the storage section 60 by the arithmetic section 30, with reference to the second indicator of the derived unit stored in the database 50.

In addition, the conversion section 20 converts the exponential part into the prefix with reference to the third list stored in the database 50. At this time, if necessary, a multiplier factor in a floating point expression is adjusted, and the adjusted multiplier factor is added to the exponential part, and then the resultant exponential part is converted into the string of the prefix.

The output device 80 displays the conversion result of the conversion section 20 in a form of a string enumerated in order of the quantity, the prefix, and the unit. Then, the output device 80 outputs the calculation result so that the user can visually recognize the calculation result.

With the arithmetic device 1000 according to this embodiment, by using the first and the second indicators assigned to the unit, even when calculation is performed between the different units, an error in the result caused by performing an unexpected reduction in the calculation between the prime numbers can be prevented. In addition, the unit can be identified regardless of an expression style (order etc.) of the derived unit.

In addition, the physical quantity is expressed in a simple sequence set of integers such as "the quantity, the unit, the exponential part of the prefix". Further, calculation is divided into three parts in which the same kind of integers are calculated just like quantity from quantity, unit from unit, and exponential part from exponential part. Therefore, calculation between different physical quantities including the unit and the prefix can be performed simply.

Further, according to this embodiment, the description has been made in connection with an example in which a user input a string such as an arithmetic expression using the input device 70 at the time of designing. In a case where a control target apparatus connected to the arithmetic device 1000 is necessary to be controlled or a physical quantity is required for diagnosing the apparatus, an arithmetic expression can be automatically obtained. In addition, instead of the arithmetic expression, a physical quantity such as a maximum allowable voltage may be assigned as an indicator to a device such as a cable connected to the arithmetic device 1000 (direct notation, or notation by putting an information tag on an electronic medium such as an RFID and an optical medium such as a bar code). Therefore, the arithmetic device 1000 can be used as a management system so that the operation of the devices is managed in a normal state.

In addition, according to this embodiment, the description has been made in connection with an example of only the SI units. However, the invention is not limited the example, but can be applied to the imperial units or the like other than the SI units.

In this case, for example, a physical indicator representing "quantity", the kind (concept) of physical quantity such as the unit notation, the length, the weight, or the like, which expresses the units (the SI units, the imperial units, etc.), is added in the sequence. For example, Meter (m) in the SI units and Yard (yd) in the imperial units belong to the same "quantity" as length.

Then, a conversion expression for converting the unit is stored as a list in the database 50. Therefore, in a case where the unit indicators are different but the physical indicators are equal, the arithmetic section 30 can convert the physical quantities between the different units with reference to the conversion expression.

(Modification)

In the first embodiment, in order to express the prefix, the exponential part of the prefix is assigned as an integer in the sequence in addition to the unit. In this modification, the unit and the prefix will be expressed at the same time.

The assignment section 10 assigns prime numbers other than 2 and 5 among the prime numbers as the first indicators in the base unit. In addition, the assignment section 10 assigns the first indicators of the base unit to the derived unit. Further, the assignment performed in this modification is the same as that in the first embodiment except the above point, so that the detailed description will be not repeated herein.

Similarly to the first embodiment, when a user inputs a string of the quantity of the physical quantity, the prefix, and the unit using the input device 70, the conversion section 20 converts the string of the unit input by the user into the second indicator with reference to the database 50.

In addition, the conversion section 20 converts the string into $Z^n$ representing the prefix with reference to the third list. In a case where n is positive, $Z^n$ is multiplied by an integer representing the numerator in the second indicator of the unit. In a case where n is negative, $Z^{-n}$ is multiplied by an integer representing the denominator. Then, the resultant value is stored in the storage section 60 as a sequence of the quantity and a third indicator of the unit on which the prefix are reflected.

For example, when the user inputs "50 kN" (50 as the quantity, N as the unit, and k as the prefix) using the input device 70, the conversion section 20 converts Newton (N) into (21, 121) as the second indicator with reference to the database 50. In addition, the conversion section 20 converts k into $10^3=1000$ with reference to the storage section 60, and multiplies 21 representing the numerator of the second indicators by 1000 to obtain 21000. Then, the conversion section 20 stores, in the storage section 60, the sequence set (50, 21000, 121) of the quantity of 50 and the third indicator on which the prefix is reflected.

When the user inputs a plurality of different physical quantities in a form of a string, the arithmetic section 30 performs calculation between the different physical quantities using the sequence (hereinafter, denoted by the sequence (a, e, f)) of the quantity and the third indicator on which the prefix is reflected, which are converted by the conversion section 20 and stored in the storage section 60.

In a case where the arithmetic section 30 determines that the units are different from each other with reference to all of the sequences obtained from the storage section 60, the arithmetic section 30 performs multiplication between the quantities ($\pi a=A$). In addition, the arithmetic section 30 performs multiplication between the numerators in the third indicator ($\pi e=E'$), between the denominators in the third indicator ($\pi f=F'$), and performs division (reduction) on each multiplied result by a common factor of E' and F', so that E and F are calculated.

Then, the arithmetic section 30 stores, in the storage section 60, a sequence (A, E, F) representing the physical quantities resulting from the calculations described above.

Therefore, the physical quantities becomes a set of integers including "the quantity, the unit including the prefix", so that the expression of the sequence can be simplified further more. By separating the calculation of the quantities from that of the units including the prefix, the different physical quantities can be simply calculated further more.

Furthermore, since 2 and 5 are excluded from the first indicator of the base unit, when the units including the prefix are calculated, an unexpected reduction is not performed. Therefore, the calculation can be performed without an error.

In addition, the description has been made focusing on an example where a decimal system is employed, in which the base Z is set to 10 (in a case of the amount of information, 1024) as the exponential part representing the prefix. However, a single prime number or the product of plural prime numbers may be used as the base Z, for example.

In this case, the assignment section 10 assigns, to the base unit, a prime number as the first indicator excepting the prime number obtained by factorizing the base Z into prime factors.

As an example, in a case where the base Z is set to 21 as the prime number representing the prefix, the assignment section 10 factorizes 21 into 3 and 7, so that the prime numbers excepting 3 and 7 may be assigned to the base unit as the first indicator. In addition, in a case where the base Z is set to 7 as a single prime number, the assignment section 10 may assign the prime numbers excepting 7 to the base unit as the first indicator.

Therefore, similarly to the case where 2 and 5 as the prime factors of 10 are excluded when the base Z is expressed using the decimal system as described above, an unexpected reduction is not performed when the units including the prefix are calculated. Therefore, the calculation can be performed without an error.

The conversion section 20 separates the prefix $Z^n$ from the integer of the third indicator, for example, using the prime factorization or the like. Then, the conversion section 20 converts the exponential part into the string of the prefix with reference to the third list stored in the database 50. In addition, referring to the second indicator of the derived unit stored in the database 50, the conversion section 20 converts the unit into a string of the derived unit or the base unit where the third indicator from which the prefix has been separated is matched with the second indicator.

Second Embodiment

Figure 5:
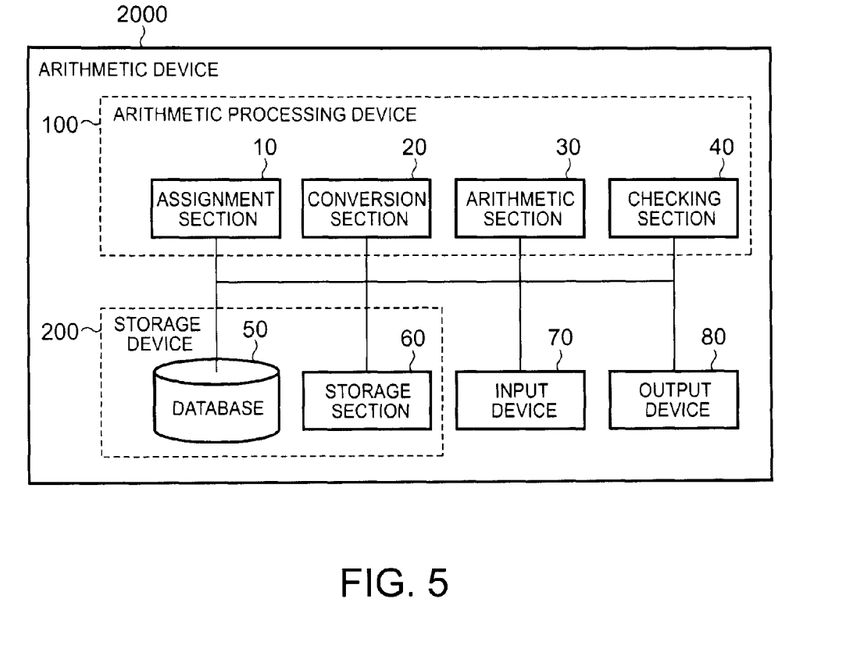
FIG. 5 is a diagram illustrating a configuration of an arithmetic device according to a second embodiment.

FIG. 5 is a diagram illustrating a configuration of an arithmetic device 2000 according to a second embodiment.

The arithmetic device 2000 is different from the arithmetic device 1000 according to the first embodiment in that a checking section 40 is provided. Further, the same components as those of the arithmetic device 1000 will be denoted with the same reference numerals, and the description thereof will not be repeated.

The checking section 40 determines whether or not, when the arithmetic section 30 performs calculation between different physical quantities, the calculation result is a significant physical quantity. The checking section 40 is embodied using the arithmetic processing device 100 such as a CPU.

Herein below, the functions of the checking section 40 will be described in detail.

The unit obtained from the calculation result can be used for determining whether or not the physical quantity is significant.

For example, in a case where the unit obtained as a result of the multiplication or the division performed between the physical quantities is not found in a combination of the base units, it can be recognized that the calculation result is an insignificant physical quantity. On the contrary, in a case where the unit is found in a combination the base units, it can be recognized that the calculation result is a significant physical quantity.

The checking section 40 obtains the sequence (A, B, C, D) as the calculation result which is stored in the storage section 60 by the arithmetic section 30, and extracts the unit portion (B, C) therefrom. Then, the checking section 40 checks the extracted unit (B, C) against the first or second indicator with reference to the first indicator of the base unit and the second indicator of the derived unit stored in the database 50.

As a result, in a case where there is a unit which is matched with the unit (B, C), that is, both conditions B=b and C=c are satisfied in the first or second indicator stored in the database 50, the checking section 40 determines that the calculation result is a significant physical quantity.

On the other hand, in a case where there is no unit which is matched with the extracted unit (B, C) in the first or second indicator stored in the database 50, the checking section 40 determines that the calculation result is an insignificant physical quantity. In this case, for example, an error message may be displayed by the output device 80, so that a user can be visually recognized.

With the arithmetic device 2000 according to this embodiment, only the calculation which obtains a significant physical quantity can be performed. Therefore, a human error caused by a user can be prevented in a user's designing process and the like.

With the arithmetic device according to at least one of the embodiments described above, calculation can be performed between different physical quantities including a unit and a prefix without an error.

While certain embodiments have been described, these embodiments have been presented by way of example only, and are not intended to limit the scope of the inventions. Indeed, the novel methods and systems described herein may be embodied in a variety of the other forms; furthermore, various omissions, substitutions and changes in the form the methods and systems described herein may be made without departing from the sprit of the inventions. The accompanying claims and their equivalents are intended to cover such forms or modifications as would fall within the scope and spirit of the inventions.

What is claimed is:

1. An arithmetic device comprising:
a database implemented by a memory, that stores a first indicator representing a base unit included in a unit system being assigned with a prime number other than a prime factor of a prefix which is expressed with a base including the prime factor and an exponential part, and a second indicator representing a derived unit expressed, by combining the base units, in a form of a simple fraction including a numerator and a denominator, each of which is assigned with an integer obtained by the product of the first indicators;
a conversion section implemented by a processor, that obtains a plurality of physical quantities each including a quantity, a prefix, and a unit,
when the unit belongs to a respective base unit, the conversion section obtaining a third indicator by converting the unit into the first indicator and multiplying the converted first indicator by the prefix,
or when the unit belongs to the derived unit, the conversion section obtaining the third indicator by converting the unit into the second indicator and multiplying the converted second indicator by the prefix; and
an arithmetic section implemented by a processor, that performs calculation between the quantities of the plurality of physical quantities and between the third indicators.

2. The arithmetic device according to claim 1, wherein the database stores the first indicator which is a prime number other than 2 and 5 and assigned to the base unit.

3. An arithmetic device comprising:
a database implemented by a memory, that stores a first indicator representing a base unit included in a unit system being assigned with a prime number and a second indicator representing a derived unit expressed by combining the base units in a form of a simple fraction including a numerator and a denominator each of which is assigned with an integer obtained by the product of the first indicators;
a conversion section implemented by a processor, that obtains a plurality of physical quantities each including a quantity, a prefix expressed with a base and an exponential part, and a unit,
when the unit belongs to a respective base unit, the conversion section converting the unit into the first indicator,
or when the unit belongs to the derived unit, the conversion section converting the unit into the second indicator; and
an arithmetic section implemented by a processor, that performs a first calculation between the quantities of the plurality of physical quantities, a second calculation between the converted first indicators or between the converted second indicators, and a third calculation between the exponential parts.

4. The arithmetic device according to claim 3, further comprising:
a checking section implemented by a processor, that checks a result of the third calculation against the first or second indicator stored in the database; and
an output section that outputs the result,
wherein when the result is not matched with any of the first and second indicator, the output section outputs an error message.

* * * * *